United States Patent Office 3,520,805
Patented July 21, 1970

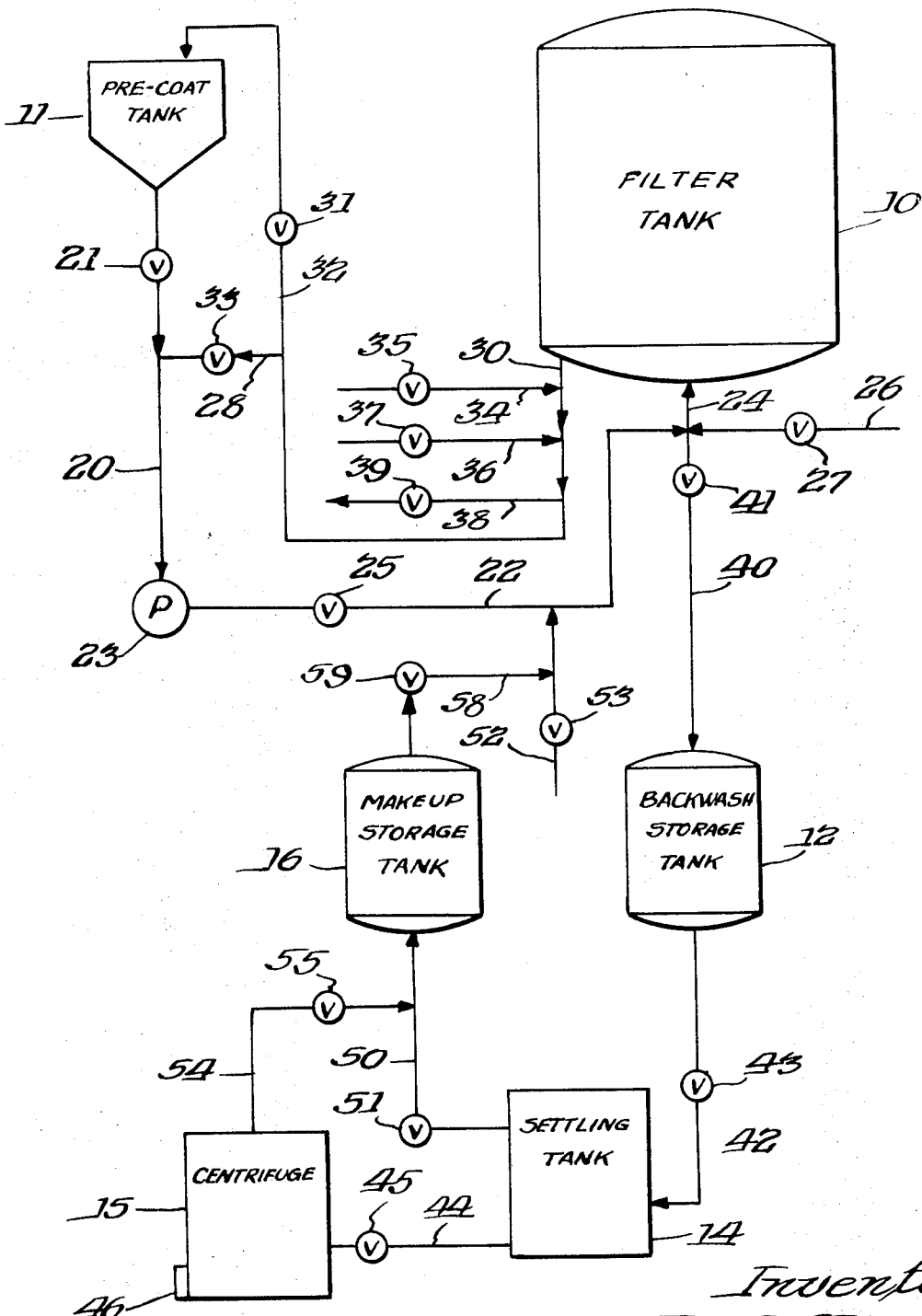

3,520,805
METHOD OF DISPOSAL OF RADIOACTIVE SOLIDS
Leo F. Ryan, Westwood, N.J., assignor, by mesne assignments, to Union Tank Car Company, Chicago, Ill., a corporation of Delaware
Filed May 29, 1967, Ser. No. 642,104
Int. Cl. B01d 15/06
U.S. Cl. 210—32                                       16 Claims

ABSTRACT OF THE DISCLOSURE

A method for removal and disposal of radioactive solids from a contaminated liquid, which employs a filter pre-coated with disposable finely divided ion exchange resin particles. When the resin particles are exhausted, the filter is cleaned by the simultaneous introduction of warm liquid and air in reverse flow, followed by a backwash cycle. The radioactive pre-coat material is allowed to settle from the cleaning and backwash liquids and is then centrifuged and discarded.

BACKGROUND—SUMMARY—DRAWINGS

This invention relates to a method for removal and disposal of radioactive impurities from contaminated liquids and, more particularly, to a method for removing and disposing of radioactive impurities from steam condensate as, for example, in a boiling water reactor system.

It is common practice in connection with nuclear power generating systems, such as boiling water reactors, to subject the steam condensate to a filtration operation to remove radioactive impurities. Heretofore this has been accomplished by passing the condensate through a filter unit containing relatively large-bead ion exchange resin particles, in the size range of 20 to 50 mesh. When such resin particles are exhausted, they are regenerated by backwashing with a suitable solution. During that process, the regenerant solution becomes radioactive and must be disposed of by special techniques.

It is well known that the cost involved in the disposal of radioactive wastes is directly proportional to the volume of such wastes. Accordingly, it is advantageous to reduce the volume to a minimum.

It has recently been discovered that improved removal of impurities from a liquid may be obtained by passing the liquid through a filter pre-coated with a layer of finely divided ion exchange resin particles having a size range of about 60 to 400 mesh. It has also recently been discovered that such a pre-coat layer can be very efficiently cleaned from the filter by passing a gas through the filter in reverse flow while simultaneously submerging the filter in a liquid, and then subjecting the filter to a backwash cycle. These improved methods are disclosed and claimed in U.S. Pat. No. 3,250,703, issued May 10, 1966, and co-pending application Ser. No. 419,126, filed Dec. 17, 1964, now Pat. No. 3,373,104, both assigned to the assignee of the present application.

It has now been discovered that the foregoing methods are particularly suitable for use, in conjunction with additional operations, in a novel method for removal and disposal of radioactive impurities from steam condensate which forms the subject of the present invention.

In summary, the present invention contemplates the employment of vertically positioned filter elements having a pre-coat layer of ion exchange resin particles in a size range of about 60 to 400 mesh. The contaminated steam condensate is passed through the filter in forward flow to effect removal of the radioactive impurities. When the resin particles are exhausted, the filter tank is drained and the filter is cleaned by introducing a gas into the filter in reverse flow while simultaneously submerging the filter in warm cleaning liquid. The cleaning liquid is then drained from the filter tank and backwash liquid is passed through the filter, also in reverse flow. The cleaning and backwash liquids are routed to a settling tank where the radioactive resin particles and other radioactive impurities are allowed to settle out as an essentially solid residue. The residue is then subjected to centrifuging to remove additional water and is finally discarded.

It will be seen that the inventive method results in a significant reduction in volume of the radioactive waste which must be discarded. Although the method requires periodic replacement of the ion exchange resin particles, rather than mere regeneration as in prior methods, the reduction in volume of radioactive waste which must be disposed of results in a significant net economic saving.

Although the preferred embodiment, which is described in detail below, contemplates the removal and disposal of dissolved and undissolved radioactive impurities from steam condensate in a boiling water reactor system, the invention has applicability in any system where it is desired to effect removal and disposal of radioactive solids from a contaminated liquid. Further features, advantages and applications of the claimed method will be more fully appreciated by considering the following detailed description, with illustrative reference to the accompanying drawing, in which there is shown a schematic representation of a removal and disposal system in which the claimed method may be employed.

DETAILED DESCRIPTION OF PREFERRED EMBODIMENT

With reference to the drawing, there is illustrated schematically a system for removing dissolved and undissolved radioactive impurities from steam condensate, and for disposal of such impurities. The system includes a filter tank 10, a pre-coat tank 11, a backwash storage tank 12, a settling tank 14, a centrifuge 15, and a makeup storage tank 16, interconnected by a number of lines and valves. The filter tank 10 is preferably of the type illustrated in co-pending application Ser. No. 419,126, filed Dec. 17, 1964, now Pat. No. 3,373,104 and includes a plurality of vertically positioned, annular-shaped filter elements. The steam condensate which is to be treated enters the filter tank 10 through an inlet line 24 and passes upward through the tank to an influent zone of the tank. From there the condensate passes through the filter elements and leaves the filter tank 10 through an outlet line 30. Fluids entering the filter tank 10 through the inlet line 24 and leaving it through outlet line 30 will sometimes be referred to herein as passing through the filter in "forward flow"; fluids entering the tank 10 through line 30 and exiting through line 24 will be considered as passing through the filter in "reverse flow."

A slurry line 20, controlled by a slurry valve 21, connects the pre-coat tank 11 with a slurry pump 23. The pump 23 is connected with the inlet line 24 of the filter tank 10 through a transfer line 22, which is controlled by a transfer valve 25. A return line 32 having a return valve 31 serves to join the pre-coat tank 11 with the outlet line 30 of the filter tank 10. The slurry line 20 and the return line 32 are interconnected by a bridge line 28 having a bridge valve 33. Also communicating with the outlet line 30 are an air line 34, a backwash line 36 and a service line 38, controlled respectively by valves 35, 37 and 39.

Communicating with the inlet line 24 of the filter tank 10, in addition to the transfer line 22, are a warm water line 26 and a drain line 40, controlled respectively by valves 27 and 41. The drain line 40 leads to the backwash storage tank 12 which is in turn connected to the settling tank 14 by a transfer line 42 having a transfer valve 43. The settling tank 14 is connected to the centrifuge 15 and to the makeup storage tank 16, respectively, by a residue line 44 having a residue valve 45 and by a transfer line 50 having a transfer valve 51. Solid material is removed from the centrifuge 15 by a disposal port 46. Liquid is removed from the centrifuge 15 through a transfer line 54 having a transfer valve 55, and is routed to the makeup storage tank 16 through the transfer line 50. Communicating with the transfer line 22 is a feed line 52, controlled by a feed valve 53. The makeup storage tank 16 is also connected to the feed line 52 through a makeup line 58 and a makeup valve 59.

The present invention will be best understood by considering a complete sequence of filter operations, beginning with the pre-coat cycle. A water slurry of a suitable pre-coat medium, preferably finely divided ion exchange resin particles in a size range of about 60 to 400 mesh, is stored in the pre-coat tank 11. During the pre-coating cycle all valves are closed except the slurry valve 21, the transfer valve 25 and the return valve 31. By starting the slurry pump 23, the resin pre-coat slurry is drawn from the pre-coat tank 11 into the filter tank 10 through the inlet line 24. Prior to initiation of the pre-coat step, the filter tank 10 is generally filled with low impurity water. Accordingly, the pressure of the incoming slurry forces the low impurity water out through the outlet line 30 and into the pre-coat tank 11 through the return line 32.

As the pre-coat cycle continues, the resin slurry, which passes through the filter tank 10 in forward flow, contacts the filter elements, and the resin particles are deposited upon the upstream surface of the filters. This depositing process continues until a sufficient pre-coat depth is built up upon the upstream surface of the filters. The slurry valve 21 and the return valve 31 are then closed and the bridge valve 33 is opened. The slurry pump 23 continues to operate until the cycling water runs clear. At this point the system is ready for the service cycle, in which contaminated steam condensate is treated. The foregoing pre-coat cycle is described in greater detail in co-pending application Ser. No. 419,126, filed Dec. 17, 1964, now Pat. No. 3,373,104.

During the service cycle the contaminated steam condensate, which contains dissolved and undissolved radioactive impurities, enters the system through the feed line 52. The contaminated condensate passes from the feed line 52 to the transfer line 22 and enters the filter tank 10 through inlet line 24. As indicated above, the condensate passes through the filter tank 10 in forward flow. The dissolved and undissolved radioactive impurities are moved from the condensate as it passes through the pre-coat layer of resin particles and the filter elements. The decontaminated condensate leaves the filter tank 10 through the outlet line 30 and is removed from the system by the service line 38. The service line 38 routes the condensate to other equipment (not shown) where it may be used for boiler feed water and other purposes.

Eventually, the pre-coat resin particles will become exhausted and must be discarded. When this occurs, the service cycle is terminated by closing the feed valve 53. The system is then ready for initiation of the cleaning cycle. The remaining condensate in the filter tank 10 is pumped from the tank through the outlet line 30 and service line 38 by suitable means (not shown); alternatively, this condensate may be routed from the filter tank 10 to the makeup storage tank 16 through suitable lines (not shown). When such removal or draining is completed, the service valve 39 is closed. At this point, the filter tank 10 is ready for simultaneous introduction of a cleansing gas (preferably air) and a cleansing liquid (preferably warm water).

Accordingly, air is introduced into the filter tank 10 in reverse flow by opening the air valve 35 in the air line 34. The volume flow rate of the entering air is preferably in the range of about 1 to 5 standard cubic feet per minute per square foot of filter surface area. Simultaneously, warm water having a temperature preferably in the range of about 100 to 200° F. is added to the filter tank 10 in forward flow by opening the valve 27 in the warm water line 26. The warm water is preferably added at a rate such that the water level in the tank 10 rises at about 5 to 10 inches per minute.

As described in co-pending application Ser. No. 419,126, filed Dec. 17, 1964, now Pat. No. 3,373,104, the simultaneous introduction of warm water and air into the filter tank 10 causes efficient removal of the exhausted resin pre-coat. When sufficient warm water has been added to the filter tank 10 that the filters are submerged, the valve 27 is closed. With the air valve 35 remaining open, the drain valve 41 is opened so that the warm water may drain from the filter tank 10 through the inlet line 24 and the drain line 40 into the backwash storage tank 12. The warm water is preferably at a rate such that the water level in the tank 10 falls at about 5 to 10 inches per minute.

After the filter tank 10 has been drained of the warm water, the reverse air flow is preferably reduced to a flow rate of about 0.5 to 1 standard cubic foot per minute per square foot of filter surface area by manipulating the air valve 35. (Alternatively, the air flow may be shut off entirely.) The filter is then backwashed by introducing a suitable backwash liquid (preferably water) in reverse flow through the backwash line 36. The backwash water leaves the filter tank 10 through the inlet line 24 and passes into the backwash storage tank 12 through the drain line 40. When the backwash step is completed, the backwash valve 37, the drain valve 41 and the air valve 35 are closed, and the pre-coat and service cycles may be repeated as described above.

At this point the backwash storage tank 12 contains the cleaning and backwash water, along with the now radioactive precoat resin particles and the undissolved radioactive impurities which were present in the contaminated steam condensate. This waste must be processed further to reduce its volume before disposal. To this end, the waste is routed to the settling tank 14 through the backwash line 42 which is controlled by the valve 43. In the settling tank 14 the radioactive solids are allowed to settle out. The supernatant cleaning and backwash water is taken from the settling tank and routed through the transfer line 50 and to the makeup storage tank 16.

An essentially solid radioactive residue settles to the bottom of the settling tank 14 and is withdrawn therefrom through the residue line 44 to the centrifuge 15. There the residue is centrifuged to remove additional water. The recovered water is routed from the centrifuge 15 to the makeup storage tank 16 through the transfer lines 54 and 50. The radioactive residue, which has now been substantially reduced in volume, is withdrawn from the centrifuge 15 through the disposal port 46 and is now ready for disposal by standard methods. The recovered water in the makeup storage tank 16 may be re-cycled through the filter tank 10 in the same manner as the original steam condensate. To this end, the makeup line 58 and the makeup valve 59 are provided to route the recovered water to the transfer line 22 during the service cycle.

Though air has been discussed specifically as the cleansing gas, other gases may be used, such as nitrogen, oxygen and the like. Air, however, is generally speaking the most economical as it is readily available in most plants. Similarly, cleaning liquids other than water may be used during the cleaning cycle. Exemplary of such liquids are alcohols, carbon tetrachloride and detergent and soap solutions. It is preferred that the liquids have a temperature in the range of about 100 to 200° F.

Typical solid cation exchange resin particles which may be employed in the method discussed herein are the divinylbenzenestyrene copolymer type, the acrylic type, the sulfonated coal type and the phenolic type. These may be used in the sodium, hydrogen, ammonium or hydrazine form, for example. Typical solid anion exchange resin particles that may be employed are the phenolformaldehyde type, the divinylbenzene-styrene copolymer type, the acrylic type and the epoxy type. The anion resin particles may be used in the hydroxide or chloride form, for example.

Though the method of the present invention has been discussed in relation to a pre-coat layer of finely divided ion exchange resin particles, the method is likewise applicable where the pre-coat layer is diatomaceous earth, or any other pre-coat material capable of removing radioactive impurities, as will be understood by one with ordinary skill in the art. Similarly, the invention is applicable to any vertically positioned filter screen having a pre-coat layer thereon, such as leaf-type filters and the like.

Although an embodiment constructed for use in accordance with the present invention has been described with the requisite particularity, the disclosure is of course only exemplary. Consequently, numerous changes in details of construction and operation, in size, configuration and arrangement of components and materials, and in modes of application will be apparent to those familiar with the art and may be resorted to without departing from the scope of the invention as set forth in the following claims.

I claim:

1. A method for removal and disposal of radioactive solids from a contaminated liquid, comprising the steps of: coating a filter with a pre-coat layer of finely divided particles capable of removing said radioactive solids from said contaminated liquid; passing said contaminated liquid in forward flow through said filter to effect removal of said radioactive solids; passing a gas through said filter in reverse flow while simultaneously submerging said filter in a cleaning liquid; draining said filter of said cleaning liquid; passing a backwash liquid through said filter in reverse flow; routing said cleaning and backwash liquids to a setting tank; allowing said finely divided particles and said radioactive solids to settle from said cleaning and backwash liquids to obtain an essentially solid residue; subjecting said residue to centrifuging to remove additional liquid; and discarding said residue.

2. The method of claim 1 wherein said finely divided particles consist of ion exchange resin particles in the size range of about 60 to 400 mesh.

3. A method for removal and disposal of radioactive solids from steam condensate, comprising the steps of: coating a vertically positioned filter in a filter tank with a pre-coat layer of finely divided ion exchange resin particles; passing said condensate through said filter in forward flow; draining said tank of said condensate; passing a gas through said filter in reverse flow while gradually adding sufficient liquid to said tank to submerge said filter; draining said liquid from said tank; passing backwash water through said filter in reverse flow; routing said liquid and said backwash water to a settling tank; allowing an essentially solid radioactive residue to settle from said liquid and said backwash water; subjecting said residue to centrifuging to remove additional liquid; and discarding said residue.

4. The method of claim 3 wherein said ion exchange resin particles are in the size range of about 60 to 400 mesh.

5. The method of claim 4 wherein said gas is air and said liquid is warm water.

6. The method of claim 4 wherein said gas has a flow rate of about 1 to 5 standard cubic feet per minute per square foot of filter surface area.

7. The method of claim 6 wherein said gas continues to flow at a reduced rate while said backwash water is passed through said filter, said reduced rate being about 0.5 to 1 standard cubic foot per minute per square foot of filter surface area.

8. The method of cliam 7 wherein said liquid is added to said tank at a rate such that the liquid level rises therein at about 5 to 10 inches per minute.

9. The method of claim 8 wherein said gas is air and said liquid is water having a temperature in the range of about 100 to 200° F.

10. The method of claim 9 wherein the liquid and backwash water recovered from the settling and centrifuging of said residue is passed through said filter with said steam condensate.

11. A method for cleaning a vertically positioned filter in a filter tank, said filter containing a pre-coat layer of radioactive ion exchange resin particles in the size range of about 60 to 400 mesh, said method comprising the steps of: passing air through said filter in reverse flow while gradually filling said tank with water to submerge said filter; draining said water from said tank; passing backwash water through said filter in reverse flow; routing said water and said backwash water to a settling tank; allowing an essentially solid radioactive residue to settle; subjecting said residue to centrifuging; and discarding said residue.

12. The method of claim 11 wherein said filter is an annular, fiber-wound filter, said air being introduced into the interior of said filter at its lower end.

13. The method of claim 12 wherein said water has a temperature in the range of about 100 to 200° F. and is added to said tank at a rate such that the water level therein rises about 5 to 10 inches per minute.

14. The method of claim 13 wherein said air has a flow rate of about 1 to 5 standard cubic feet per minute per square foot of filter surface area.

15. The method of claim 14 wherein said air continues to flow at a reduced rate while said backwash water is passed through said filter, said reduced rate being about 0.5 to 1 standard cubic feet per minute per square foot of filter surface area.

16. The method of claim 15 wherein the water recovered from the settling and centrifuging of said residue is passed through said filter with said steam condensate.

References Cited

UNITED STATES PATENTS

| | | | |
|---|---|---|---|
| 1,873,598 | 8/1932 | Jones | 210—73 X |
| 2,616,847 | 11/1952 | Ginell | 210—38 X |
| 3,265,212 | 8/1966 | Bonsall | 210—73 |
| 3,373,104 | 3/1968 | Ryan | 210—32 |

SAMIH N. ZAHARNA, Primary Examiner

U.S. Cl. X.R.

210—35, 73, 75